United States Patent [19]

Gates et al.

[11] 4,272,810

[45] Jun. 9, 1981

[54] ARRANGEMENT FOR DELETING TRAILING MESSAGE PORTIONS

[75] Inventors: Geoffrey W. Gates, Woodridge; Garry D. Kepley, Wheaton, both of Ill.

[73] Assignee: Bell Telephone Laboratories, Incorporated, Murray Hill, N.J.

[21] Appl. No.: 972,074

[22] Filed: Dec. 21, 1978

[51] Int. Cl.³ .................. H04M 1/64; G06F 7/22
[52] U.S. Cl. .................. 364/900; 179/1 VC
[58] Field of Search ... 364/200 MS File, 900 MS File; 179/1 VC, 100.1 VC, 100.1 DR, 6 E, 6 R

[56] References Cited

U.S. PATENT DOCUMENTS

| 3,535,696 | 10/1970 | Webb | 364/200 |
| 3,723,667 | 3/1973 | Park, Jr. et al. | 179/1 VC X |
| 4,130,739 | 12/1978 | Patten | 179/100.1 VC |

*Primary Examiner*—Melvin B. Chapnick
*Assistant Examiner*—Thomas M. Heckler
*Attorney, Agent, or Firm*—Peter Visserman

[57] ABSTRACT

A message storage system (104) deletes trailing silence from messages stored therein. Voice messages are converted to digital signals and stored as data blocks in a digital storage system (114a). Voice signals are detected in messages to be stored and voice present bits are generated and included in the individual data blocks to indicate whether voice signals are present in the data blocks. During storage of the data blocks, the voice present bits which identify data blocks containing no voice signals increment a counter (311), and voice present bits which identify data blocks containing voice signals clear the counter (311). The final count in the counter is representative of the trailing data blocks which do not contain voice signals, i.e., silence, and these data blocks are deleted from the digital storage system.

8 Claims, 6 Drawing Figures

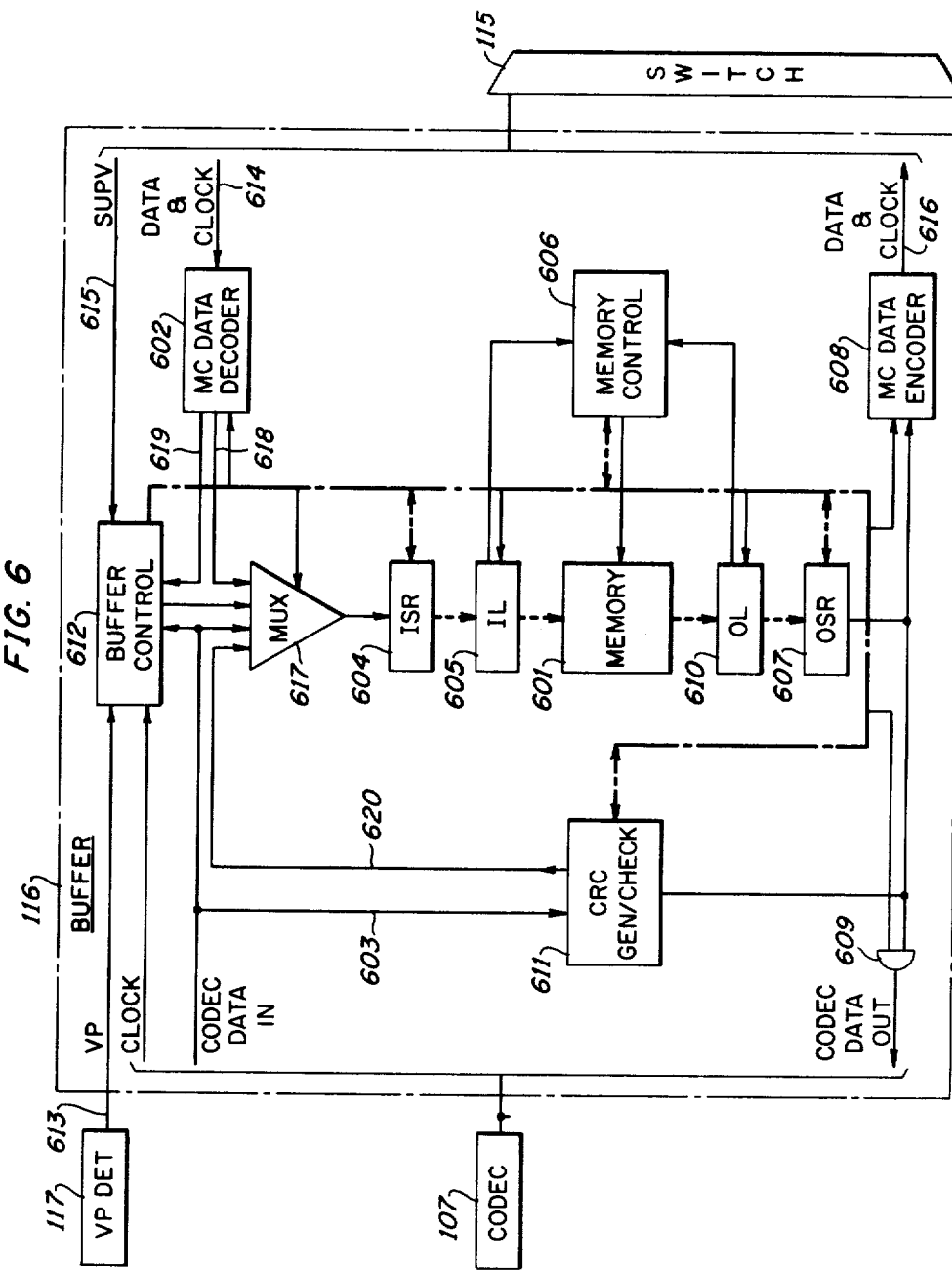

ARRANGEMENT FOR DELETING TRAILING MESSAGE PORTIONS

CROSS-REFERENCE TO RELATED APPLICATIONS

This application is related to the following applications which were filed concurrently herewith and assigned to the assignee of the present application: the application of R. G. Cornell et al., Ser. No. 972,033, filed Dec. 21, 1978; the application of D. E. Haben et al., Ser. No. 972,030, filed Dec. 21, 1978; the application of D. E. Haben et al., Ser. No. 972,073, filed Dec. 21, 1978; and the application of R. G. Cornell et al., Ser. No. 971,726, filed Dec. 21, 1978.

BACKGROUND OF THE INVENTION

This invention relates to message storage systems generally and more particularly to a method and apparatus for the deletion of trailing message portions which are devoid of significant message information signals.

Various message storage services are well known in the prior art. For example, call answering equipment connected to a telephone customer's station intercepts incoming calls with a recorded announcement, records any message which a calling customer wishes to have delivered to a called customer, and, when instructed to do so, plays back any messages recorded for the called customer. Often times a calling customer who is leaving an extemporaneously composed message for the called customer will leave long periods of silence before he begins speaking his message and after he has concluded his message. These periods of silence not only waste storage space in the message storage system but also are annoying to the called customer who is retrieving messages due to the potentially large silent gaps between messages which are played back to the customer.

SUMMARY OF THE INVENTION

In accordance with our invention, trailing message portions which do not contain significant message information signals are deleted from messages to be stored in the message storage system by measuring the final period of time of a message during which no significant message information signals are received and then by deleting an equivalent portion of the recorded message. The messages are monitored for significant message information signals and a message present signal is generated during periods of time when significant message information signals are detected. Periodic pulses are counted during periods of time that no significant message information signals are present in the message to be stored, and the counter circuit is cleared each time a message present signal is generated. Upon message completion, the count of periodic pulses is representative of the trailing message portion which does not contain significant message information signals and that trailing message portion is deleted from storage.

Advantageously, storage space in the message storage system is saved and message retrieval is more pleasant for the customer since potentially long portions of trailing silence are not interspersed with the stored messages.

BRIEF DESCRIPTION OF THE DRAWING

The invention will be better understood from the following detailed description when read with reference to the drawing in which:

FIG. 6 is a block diagram showing additional detail of the buffer circuits used in the message storage system.

DETAILED DESCRIPTION

Figure 1:
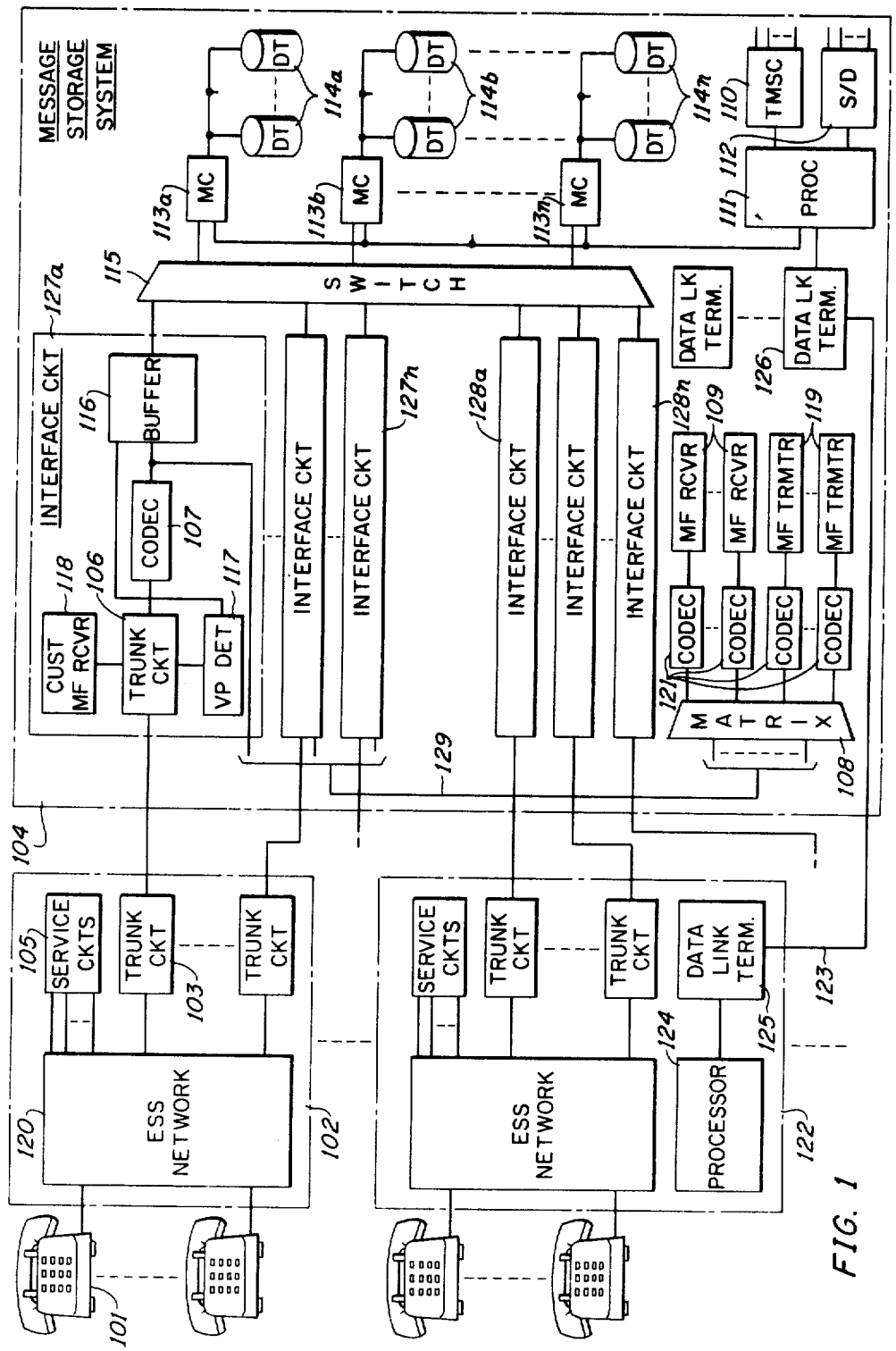
FIG. 1 is a block diagram of an illustrative message storage system in accordance with our invention together with a plurality of associated switching offices.

FIG. 1 is a block diagram of an illustrative message storage system in accordance with our invention and a plurality of associated switching central offices. The illustrative message storage system is primarily adapted to receive voice messages as analog signals and convert them to digital signals for storage in the system. It is noted that the illustrative system as disclosed can store data signals received as analog signals, by converting them to digital signals, and that our invention is equally applicable to systems which receive digital input signals directly. Most modern telephone switching offices can be modified to operate with the illustrative message storage system (MSS) in accordance with our invention; however, for ease of description an electronic switching system (ESS) as disclosed in U.S. Pat. No. 3,570,008 and *The Bell System Technical Journal* (BSTJ), Vol. 43, September, 1964, will be assumed.

Although a large variety of message storage services can be provided by the message storage system disclosed, call answering service will be described to illustrate the basic operation of the system. An overview of call answering service will be provided followed by a more detailed description.

A customer, represented by the customer station 101, of one of the associated ESS offices who wishes to activate call answering service goes off-hook, receives dial tone from the ESS office 102, and dials or keys a code to the ESS office. The ESS office recognizes the code as a request for call answering service by either examining the digits received and looking for the specific code or by using a translator similar to translators described in the BSTJ article previously referenced. In response to the call answering code, the ESS office 102 seizes an idle trunk circuit 103 to the MSS 104 and connects a multifrequency (MF) transmitter, represented by the service circuits 105, to the trunk circuit 103 via the ESS network 120. The MSS recognizes the trunk seizure from the ESS office over the MSS trunk circuit 106 and returns a start pulsing signal to the ESS office when the MSS is ready to receive control signals from the ESS office. Upon receiving the start pulsing signal from the MSS, the ESS office outpulses control signals which comprise a code indicating that call answering service is requested and the identification of the customer who is requesting call answering service. The message comprising the control signals is composed by the ESS office with the aid of a commonly available feature referred to as automatic number identification (ANI) which provides the requesting customer's telephone number to the ESS office processor.

The MSS receives the control signals via the MSS trunk circuit 106, the coder/decoder (CODEC) 107, the matrix 108, one of the CODECs 121, and one of the MF receivers 109 connected to the matrix. The MSS trunk circuit 106 and the matrix 108 are controlled by the trunk matrix scan controller (TMSC) 110 and the signals received by the MF receiver 109 are transmitted to the processor 111 via the scanner distributor circuit (S/D) 112. In response to the control signals, the processor 111 of the MSS recognizes that activation of call answering service has been requested by a customer of one of the associated ESS offices and prepares a customer directory to identify the requesting customer and locations of stored signals which relate to the customer's call answering service. The processor 111 also selects a message controller (MC), one of the MCs 113a through 113n, for the service request and sends instructions to the selected MC. Each MC controls its associated disc transports 114a through 114n, the switch circuit 115, and the buffer circuits, represented by the buffer circuit 116, as will be more fully described hereinafter. In accordance with the instructions sent by the processor, the selected MC loads digital signals from one of its disc transports into the buffer circuit 116 and activates the buffer circuit to transmit the digital signals to the associated CODEC. The CODEC converts the digital signals to analog signals which are transmitted to the requesting customer to inform the customer that the call answering service has been reached. The analog signals are transmitted through the MSS trunk circuit 106, the ESS trunk circuit 103, and the ESS network 120 to the requesting customer. The MC then loads a prerecorded prompting announcement into the associated buffer circuit to instruct the requesting customer as to call answering service and to request that a personal announcement be recorded for delivery to persons calling the requesting customer's telephone number. The instructional announcement is terminated by a tone which indicates to the requesting customer that he or she is to begin speaking a personal announcement. The processor again selects a message controller which is not necessarily the same message controller as was used to initially instruct the requesting customer, and includes appropriate instructions in the list of instructions or work list sent to that message controller. The state of the buffer circuit 116 autonomously changes such that the MSS can receive and store the announcement from the customer as will be more fully described hereinafter. The voice present detector 117 provides a voice present signal to the buffer circuit when voice is being received by the MSS trunk so that the buffer circuit can delete leading silence from messages recorded by the MSS.

As the customer commences to deliver a personal announcement, it will be transmitted in analog form through the ESS network 120, the ESS trunk circuit 103, the MSS trunk circuit 106, and into the coder/decoder 107, where the analog message is transformed into digital signals. The digital signals from the coder/decoder 107 are temporarily stored in the buffer circuit 116 for speed buffering reasons. When the buffer circuit associated with the requesting customer has accumulated a defined number of digital signals, the selected message controller controls one of its associated disc transports, the switch, and the buffer circuit to unload the defined number of digital signals from the buffer circuit and store these signals on the disc transport at locations specified by the processor via the work list. For announcements or messages in excess of a few seconds in length, the associated buffer circuit will be refilled and emptied a number of times in accordance with the operations just described.

When the customer has completed the delivery of a personal announcement, he or she can request to have it played back by keying or dialing an appropriate control signal into the MSS. Such customer control signals reach the MSS processor via the customer multifrequency receiver circuit 118 which receives customer generated multifrequency signals, e.g., the multifrequency signals used by the Bell System to provide TOUCH-TONE service or by dial pulse scanning at the MSS trunk circuit 106 using the TMSC 110. TOUCH-TONE is a registered service mark of American Telephone and Telegraph Company. At this point appropriate instructions are included in a work list which is provided to the MC associated with the disc transport on which the requesting customer's personal announcement was recorded and the MC controls the switch, the buffer and the disc transport to play back the customer's personal announcement so that its accuracy can be verified. When satisfied, the customer goes on-hook and the call answering service is activated.

Once a customer has activated call answering service, the MSS informs the ESS office that the requesting customer has successfully activated the service. An information message is compiled by the processor 111 and transmitted to the ESS office 102 via one of the MF transmitters 119, one of the CODECs 121, the matrix 108, the CODEC 107, the MSS trunk circuit 106, and the ESS trunk circuit 103. The MSS message tells the ESS office how to treat the activated customer's line. For example, a customer may have the option of requesting phone calls be intercepted or transferred to MSS immediately and that his phone not be rung or the customer may specify the number of rings to be allowed before a call is intercepted. Service information for each customer of the associated ESS offices is stored in the MSS to utilize the large storage capacity of the MSS and to avoid increasing the storage requirements of the ESS offices. Once service information is transferred from the MSS to an ESS office, it is stored in the recent change storage area of the ESS office and a single MSS service bit which is included per ESS office customer is set to indicate that reference should be made to the recent change storage area for call processing. If the customer deactivates a message storage service (by keying or dialing defined codes) the information in the recent change storage area is erased and the customer's MSS service bit is cleared.

When an incoming call is intercepted, the ESS office selects an idle trunk to the MSS and informs the MSS of the interception and the identity of the call answering customer so that the MSS can play back the customer's personal announcement and record a message to be subsequently delivered to the call answering customer. This information is provided by the ESS office via an MF transmitter over the ESS trunk circuit 103, the MSS trunk circuit 106, the coder/decoder 107, the matrix 108, and the MF receiver 109, as previously described. On the basis of this information the processor 111 selects an appropriate MC which has access to a disc transport containing the identified customer's personalized announcement. During this period of time, the calling customer is receiving audible ring via the normal operations of the ESS office. It is noted that the calling customer may be a customer of the same ESS office as the call answering customer or one of the other offices associated with the message storage system or can be any customer having access to the national or international telephone system. The selected MC accesses the personal announcement of the call answering customer and transfers it from the disc transport to the associated buffer circuit via the switch circuit whereby the announcement is provided to the calling customer as previously described. The MSS next provides a prompting announcement which is terminated by a tone to indicate to the calling customer that he or she can begin speaking a message. When the tone signal terminates, the buffer circuit autonomously changes its state to receive a message from the calling customer for later delivery to the call answering customer as will be more fully described hereinafter. The processor 111 selects an MC to control the storage of the calling customer's message. It is noted that the MC which receives the calling customer's message does not necessarily have to be the same MC as that which provided the customer's personalized announcement to the calling customer. After a message has been successfully accepted by the call answering service of the MSS, the MSS informs the ESS office which stores the information in the recent change storage area as previously described so that the call answering customer will be notified by the ESS office that one or more messages are waiting in the MSS for that customer.

The ESS office notifies the call answering customer that one or more messages are waiting in the MSS by providing a distinctive dial tone, e.g., an interrupted or stuttered dial tone for a short period of time after the customer initially lifts his telephone handset. At that time the call answering customer can key or dial a specified code into the ESS office and be connected to the MSS which will play back that customer's messages. For security, The MSS verifies that the call originates from the call answering customer's telephone or requires a special identification code before any messages are played back. The call answering customer can exert direct control over the MSS by dialing or keying in defined codes which are received by the MSS via the customer multifrequency receiver circuit 118 or via the TMSC monitoring dial pulses received by the MSS trunk 106. For example, the customer can skip selected messages, such as those directed to other members of the customer's family; the customer can delete selected messages; or, the customer can request replay of selected messages. After the call answering customer has received the messages from the MSS, the customer can maintain active call answering service by simply hanging up his telephone handset or he can deactivate the call answering service by dialing or keying a defined code into the ESS office.

The ESS office 122 and the MSS 104 are additionally interconnected by the communications data link 123 which allows direct high speed data communications between the ESS processor 124 and the MSS processor 111 via the data link terminal 125 and the data link terminal 126. Such a data link interconnection is illustrated by Common Channel Interoffice Signaling (CCIS) as disclosed in the *Bell System Technical Journal*, Vol. 57, February, 1978. ESS offices which are equipped with communications data links do not require the MF transmitters 119, the MF receivers 109, and associated interconnecting circuits, e.g., the matrix 108, for exchanging control signals. ESS offices which are not equipped with communication data links are connected to the interface circuits 127a through 127n, and the interface circuits 128a through 128n connect the MSS to ESS offices which are equipped with communication data links. The interface circuits 128a through 128n are identical to the interface circuits 127a through 127n except that the conductors 129 which connect the interface circuits 127a through 127n to the matrix 108 have been eliminated.

Figure 2:
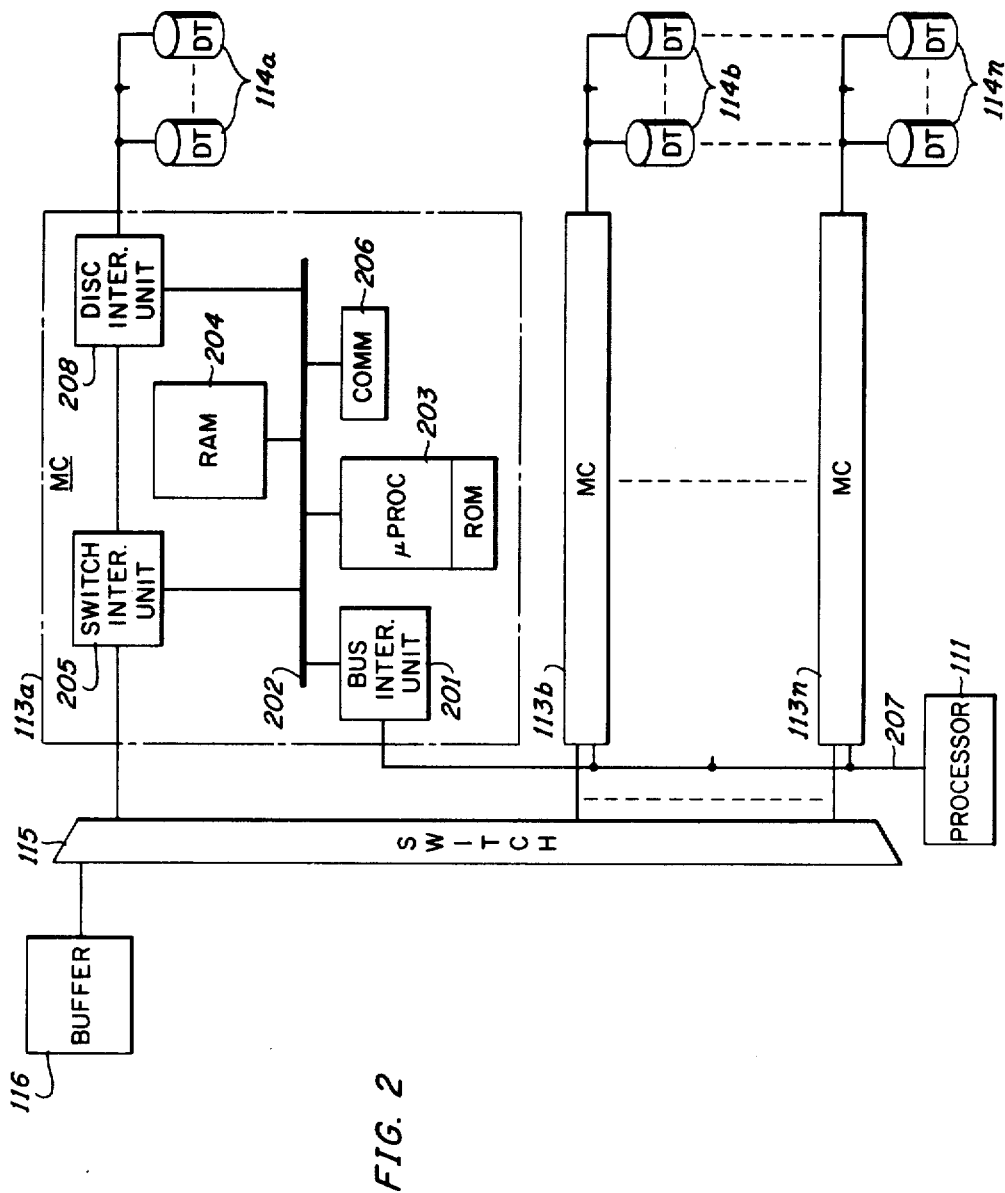
FIG. 2 is a block diagram showing additional detail of the storage control circuits (referred to hereinafter as message controllers) used in the illustrative message storage system of FIG. 1.

FIG. 2 is a block diagram of the message controller 113a to provide additional detail of the message controllers used in the MSS. The processor 111 provides work lists comprised of read voice orders and write voice orders to the message controllers via the processor bus 207. The microprocessor 203 has its instruction set stored in a read only memory (ROM) shown as part of the microprocessor 203. The microprocessor receives the work lists from the processor bus 207 via the bus interface unit 201 and the bus 202 and loads them into the random access memory (RAM) 204. Each work list is made up of a number of individual jobs either reading message signals from a disc transport or writing message signals onto a disc transport. Each of these jobs includes information required by the microprocessor including the identification or address of the buffer circuit associated with the job, the customer identification number which uniquely identifies the customer obtaining service from the MSS, and disc information including the disc number, the cylinder address, and the head addresses which define the disc surfaces in a cylinder hereinafter referred to as tracks. The microprocessor 203 reads the work list from the RAM 204 and determines what operations are required of it by decoding the commands into state vectors which together with the information required per job are loaded into a job table in the RAM 204. After the microprocessor has loaded the job table into the RAM, the microprocessor commands the switch 115 via the switch interface unit 205 to connect the MC to the buffer circuits associated with active jobs assigned to that MC. Each active buffer circuit, represented by the buffer circuit 116, is interrogated by the MC and responds with a signal indicating whether or not it is half empty for a playback job, i.e., requires digital signals to be loaded from a disc transport or half full for a record job, i.e., requires digital signals to be unloaded to a disc transport. The microprocessor updates the state vectors to reflect various job priorities which ensure that an MSS call in progress will be serviced before information is lost or a customer encounters a gap in the playback of a message. Jobs are queued according to the cylinder address in order of the lowest address to the highest address so that the motion of the moving head of the disc transport is minimized to maximize the transfer of data between the buffer circuits and the disc transports. The disc interface unit 208 is controlled by the microprocessor to properly sequence data exchange with the disc transports. The communication circuit 206 allows the microprocessor to communicate with circuits external to the MC, e.g., the switch 115 and the buffer circuits represented by the buffer circuit 116.

Figure 3:
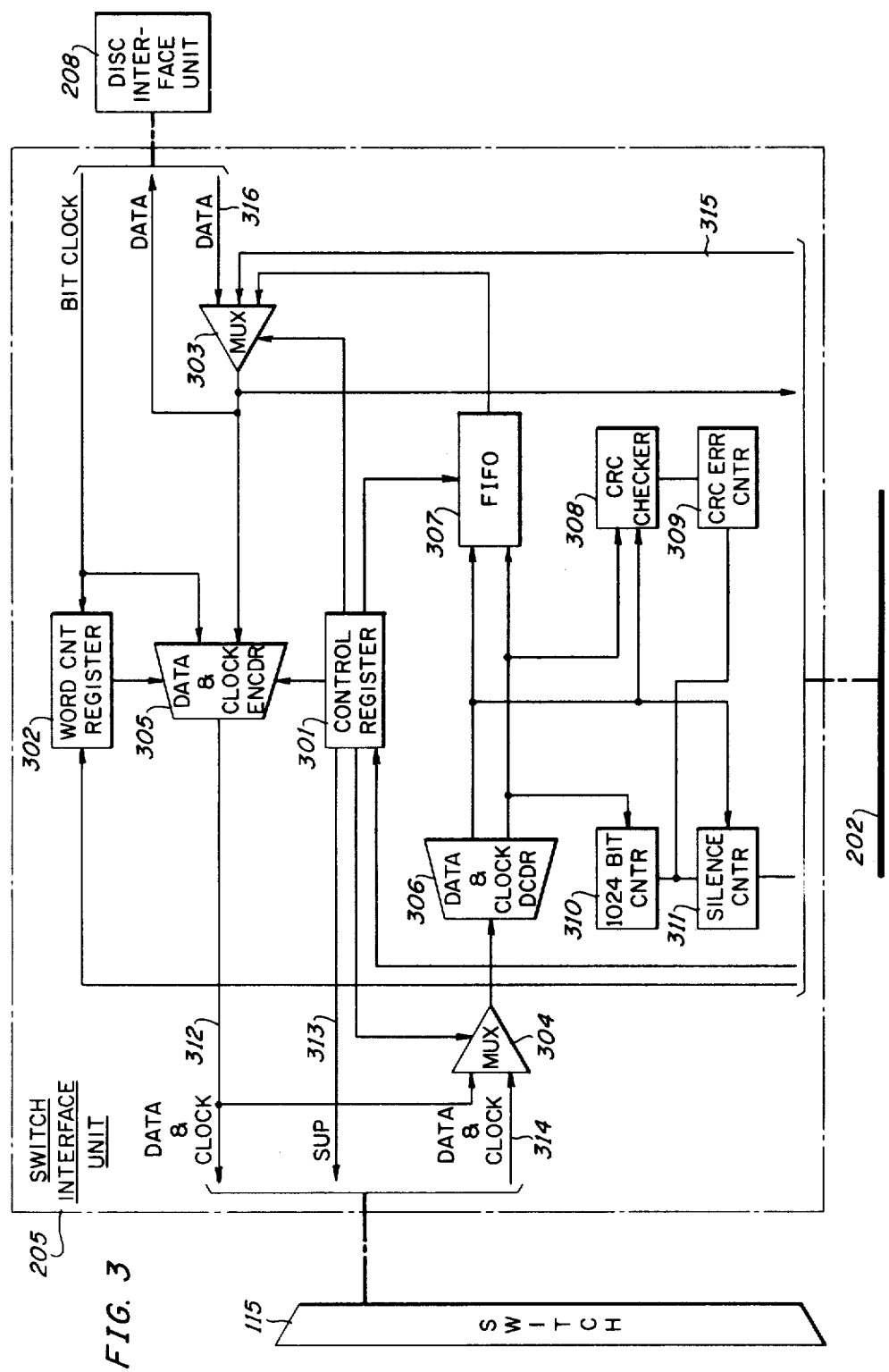
FIG. 3 is a block diagram of the switch interface unit of the message controllers.

FIG. 3 is a block diagram of the switch interface unit 205 of FIG. 2. The microprocessor 203 controls the switch interface unit via the control register 301 and the word count register 302. The microprocessor checks the job queue and determines which job is to be performed next based on the location of the assigned storage areas to be used for the jobs as previously described. Assuming that a write voice job is next to be performed, the microprocessor reads the state of the associated buffer circuit and if the buffer indicates that it is half full the job is scheduled. When the associated disc address comes on cylinder, the microprocessor reads the header for the assigned track to verify that this is a useable message track and does not contain preexisting digitally encoded signals which should be retained. The microprocessor loads an all-zeroes word and a synchronizing word into the communication circuit 206. The microprocessor through the control register 301 then sets the multiplexer 303 to pass data received from the communication circuit 206 via the conductor 315, sets the multiplexer 304 to loop combined data and clock signals around from the data and clock encoder 305 to the data and clock decoder 306, clears the first-in-first-out (FIFO) register 307, and enables the data and clock encoder 305 while simultaneously shifting out the all-zeroes word and the synchronizing word from the communication circuit 206. In this way an all-zeroes word and a synchronizing word are loaded into the FIFO register 307 via the communication circuit 206, the bus 202, the multiplexer 303, the data and clock encoder 305, the multiplexer 304, and the data and clock decoder 306. The microprocessor then sets the multiplexer 303 to pass signals received from the FIFO register 307 and the multiplexer 304 to pass signals received from the buffer circuit 116 via the switch 115 and the conductor 314. The buffer circuit is placed in a state designated as "empty" whereby data contained in the buffer circuit is transferred to the disc transports via the switch and MC if clock signals are provided to the buffer circuit from the switch interface unit.

High speed data transfer between a buffer circuit and a disc transport is controlled by a bit clock which is generated by the disc transports and transmitted by the switch interface unit to the buffer circuits. Data signals and the bit clock signals are combined into a data and clock signal by the data and clock encoder 305 to ensure synchronization of the data signals and the clock signals. All-zeroes data is transmitted when only clock signals are required. The buffer circuit obtains its high speed clock for data transfer between the buffer and MC only from the switch interface unit to help ensure synchronization with the associated disc transport. When the disc transport passes an identifying sector mark, the microprocessor starts a disc write and allows a defined number of words of zeroes to be written by providing no write input to the disc transport. The microprocessor then starts the FIFO register 307 and enables the data and clock encoder 305 to commence sending clock signals to the buffer circuit. Initially, the all-zeroes word and the synchronizing word are passed to the specified disc transport from the FIFO register 307. The transfer of the all-zeroes word and the synchronizing word allows time for the data signals to travel from the buffer circuit and to start accumulating in the FIFO register 307 so that the data transmission can continue uninterrupted. While the data transfer is taking place, the microprocessor compiles a track header which identifies the particular track of information being stored. When the transfer is complete, the header is written into the header storage area at the beginning of the track.

The message controllers 113a through 113n provide control signals to the switch 115 and the buffer circuits represented by the buffer circuit 116 through the switch interface unit 205. The microprocessor of an MC loads the control signals into the communication circuit 206, sets the multiplexer 303 through the control register 301 to pass signals received from the communication circuit 206 via the conductor 315, raises the signal on the supervisory conductor 313 to a high logic level or a "1" through the control register 301, and enables the data and clock encoder 305 while simultaneously shifting out the control signals from the communication circuit 206. The switch 115 and the connected buffer circuit respond to a high signal on the supervisory conductor 313 by decoding and loading the data signals into command shift registers as will be described hereinafter. If status messages are to be received from the switch and buffer circuit, the microprocessor of an MC sets the multiplexer 303 to pass signals received from the FIFO register 307, sets the multiplexer 304 to pass signals received on the conductor 314, clears the FIFO register 307, enables the data and clock encoder to provide clock signals to the circuit being interrogated, enables the FIFO register 307, and enables the communications circuit 206 to receive the status signals.

Each block of data written onto a disc transport comprises 1024 bits which includes 16 bits of cyclic redundancy code (CRC) generated by a buffer circuit represented by the buffer circuit 116, and a single bit indicating whether voice was present during that 1024 bit block as detected by the voice present detector 117 of FIG. 1. This cyclic redundancy code is generated such that the output signal from the cyclic redundancy code checker 308 will be at a low logic level or a "0" for a valid data transfer and at a high logic level or a "1" for an error. A CRC error count is maintained in the CRC error counter 309 which is incremented for a high output signal from the CRC checker but not for a low output signal. The 1024 bit counter 310 strobes the output of the CRC checker circuit 308 into the CRC error counter 309 for every block of data to accumulate a count of CRC errors.

When a message is being stored in the MSS, the speaker often allows several seconds of silence to follow the message. The voice present bit indicated previously is a "1" if voice is present in a data block and is a "0" if voice is not present in the block. The 1024 bit counter 310 strobes a silence counter 311 which counts up silent blocks of data so that trailing silence can be eliminated from recorded messages. If the voice present bit is equal to a "1", the silence counter 311 is cleared indicating that zero blocks have been silent. However, for each voice present bit which is equal to "0", the silence counter 311 is incremented by one. The final count in the silence counter 311 indicates the number of blocks of data that have passed and have not contained voice signals. The microprocessor uses this final count to effectively delete those silent blocks from storage on the disc transport by modifying the associated track headers to indicate that only a portion of the final storage contains significant message information signals, i.e., only up to the silent blocks. Trailing silence deletion improves the real time operation of the message storage system by reducing the number of silent data blocks transferred from the disc transports to the buffer circuits and allows precise time spacing between adjacent messages played back to a call answering customer.

If a read data job or playback is next to be performed, the microprocessor reads the state of the associated buffer circuit and if the buffer circuit indicates that it is half empty the job is scheduled. When the associated disc address comes on cylinder, the microprocessor reads the header of the identified track to verify that it has been correctly identified for the message to be played back. The microprocessor sets the multiplexer 303 into a state to pass data from the disc interface unit 208 via the conductor 316 and loads the word count register 302 with the number of words or data blocks to be transferred. The word count register is decremented for each word or data block transferred to the buffer circuit and the transfer is terminated when the contents of the word count register equal zero. The microprocessor establishes a path through the switch 115 to the associated buffer circuit and places the buffer circuit into a state designated as "load" whereby data is transferred from the disc transports to the buffer circuits via the MC and the switch.

Data signals and clock signals are combined by the data and clock encoder 305 to avoid synchronization problems between data signals and clock signals. Conversely, the data and clock decoder 306 separates the combined data and clock signals into individual data signals and clock signals.

Figure 4:
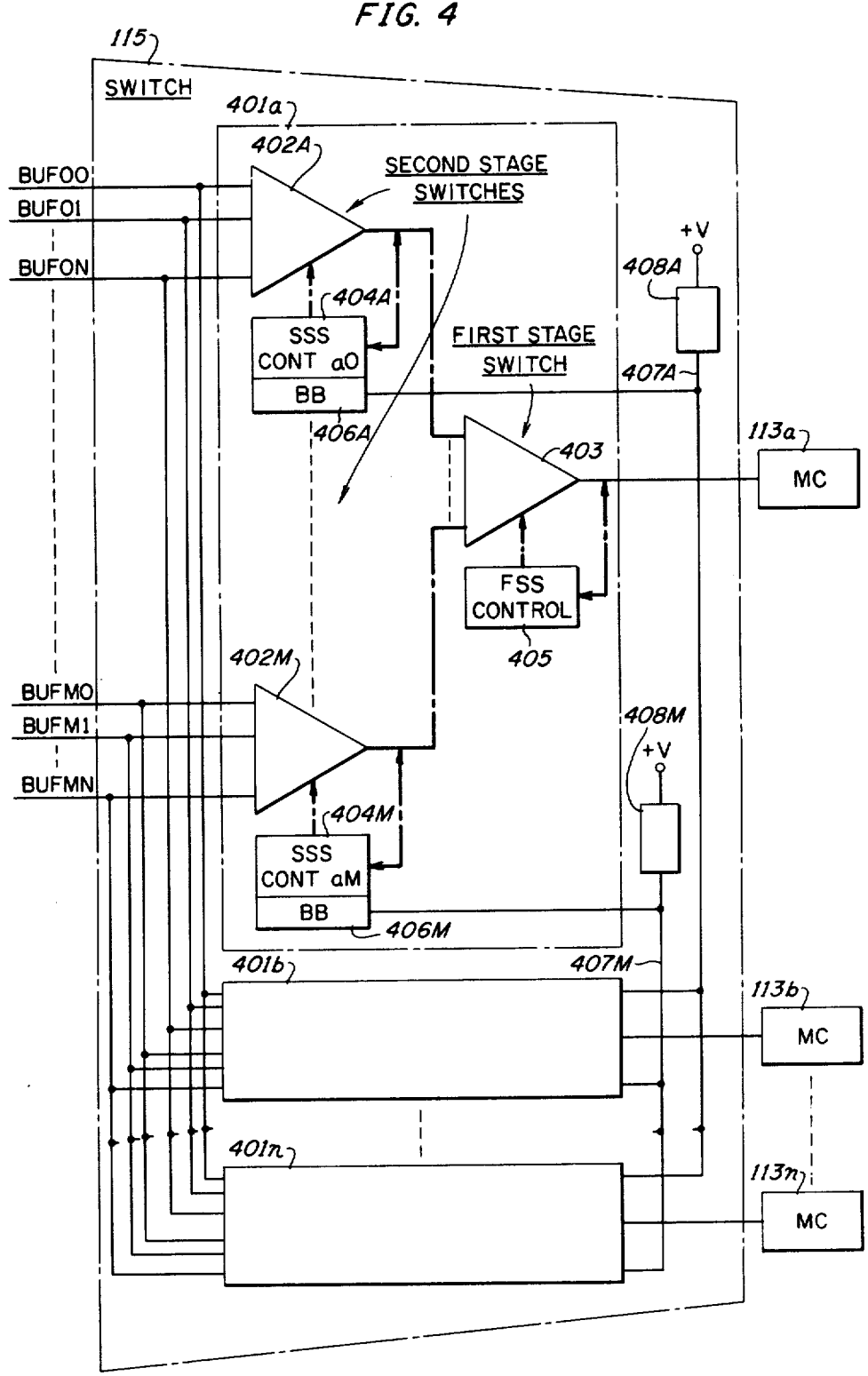
FIG. 4 is a schematic diagram of an illustrative configuration for the switch which interconnects the message controllers and the buffer circuits of the illustrative message storage system.

FIG. 4 is a block diagram showing an illustrative configuration for the switch 115 which interconnects the message controllers 113a through 113n with the buffer circuits represented by the buffer circuit 116. Each of the message controllers has a nonblocking two-stage switch module indicated by the blocks 401a through 401n for interconnecting that message controller to the buffer circuits BUFOO through BUFMN. The first-stage switch of each switch module comprises the one by M switch 403. The second-stage switches of each switch module comprise the M one by N switches 402A through 402M. Each of the second-stage switches 402A through 402M in each of the switch modules 401a through 401n is controlled by an independent second-stage switch controller 404A through 404M, respectively, while each first-stage switch 403 contained in the switch modules 401a through 401n is controlled by its first-stage switch controller 405. Each message controller controls its associated switch module by sending out digital control words over the data and clock conductor 312 and a supervisory signal over the conductor 313 both shown in FIG. 3.

If the supervisory signal is at a high logic level or a "1", the control words are shifted into a shift register where they are stored and decoded to control the connections of their associated switch. The digital control word sent to the switch module by the MC comprises three segments. The first segment of the control word is a first-stage switch setup command which includes address signals to direct the first-stage switch to connect the associated MC to the addressed one of the M second-stage switches. The first-stage sitch setup command also serves to tear down the connection through the previously connected second-stage switch. The first-stage switch setup command is loaded into the first-stage switch controller 405 and it is also loaded into the second-stage switch controller of the previously connected second-stage switch. The first-stage switch controller responds to the first-stage switch setup command by setting up a connection through the first-stage switch; and, the second-stage switch controller of the previously connected second-stage switch responds to the first-stage switch setup command by tearing down the previous connection through that second-stage switch. The second segment of the control word comprises clock signals only to allow time for the requested connection to be set up through the first-stage switch and for the previous second-stage connection to be torn down.

The third segment of the control word is a second-stage switch setup command which includes address signals and is entered into both the first-stage switch controller and the second-stage switch controller selected by the first-stage switch connection. However, no action is taken by the first-stage switch controller since it does not respond to any second-stage switch commands. The second-stage switch controller selected by the first-stage switch connection responds to the second-stage switch command by setting up a path to the addressed buffer circuit if the buffer circuit is idle, i.e., not connected to another MC. The second-stage switch controller initially performs a busy test on the buffer circuit which is addressed in the third segment of the switch control word. The busy test is performed by the busy bus circuits 406A through 406M contained in the second-stage switch controllers of each of the switch modules 401a through 401n. If the busy bus test indicates that the addressed buffer circuit is busy, a busy signal is generated and the connection through the second-stage switch is not completed. A message controller will make a second attempt to connect to a busy buffer circuit; however, if the buffer circuit is still busy upon the second attempt, the message controller defers the job for later performance.

Figure 5:
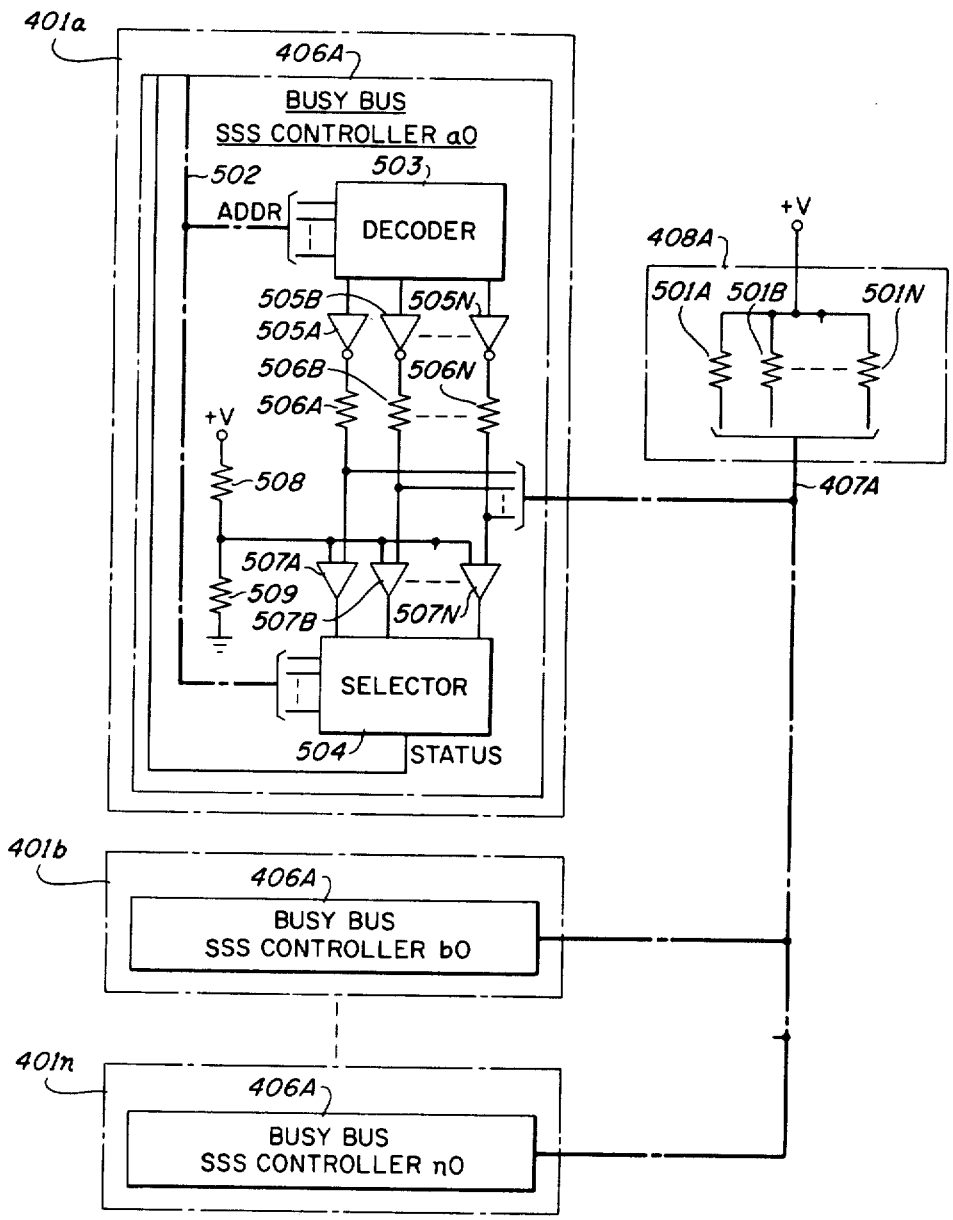
FIG. 5 is a schematic diagram of the busy bus circuit used in the message storage system.

The busy bus circuitry is primarily contained in the second-stage switch controllers with pull-up resistor blocks 408A through 408M being connected in the backplane wiring via the conductors 407A through 407M. The busy bus circuitry associated with the second-stage switch controllers of all individual second-stage switches which connect to a given group of buffer circuits, e.g., 406A of the switch modules 401a through 401n which connect to buffer group 0 which comprises the buffer circuits BUFOO through BUFON, are interconnected into groups via the conductors 407A through 407M as shown in FIG. 4. For example, the busy bus circuitry for the second-stage switches which are associated with buffer group 0 are shown in FIG. 5. Second-stage switch controller a0 (404A of 401a) indicates that this is the controller for the second-stage switch which interconnects message controller 113a to the 0 group of buffer circuits; second-stage switch controller b0 (404A of 401b) indicates that this is the controller for the second-stage switch which interconnects message controller 113b to the 0 group of buffer circuits; and second-stage switch controller n0 (404A of 401n) indicates that this is the controller for the second-stage switch which interconnects message controller 113n to the 0 group of buffers. Similar designations apply to switch controllers which control second-stage switches which connect the message controllers to the remaining buffer groups, i.e., buffer group 1 through buffer group M.

As shown in FIG. 5, the conductors 407A interconnect the busy bus circuits 406A of each of the switch modules 401a through 401n and the pull-up resistors 501A through 501N of the resistor block 408A to form the busy bus circuitry for the 0 group of buffer circuits which comprises BUFOO through BUFON. The busy bus circuitry for all buffer groups is similarly formed by the conductors designated as 407A through 407M. For simplicity of description, only the busy bus circuitry associated with buffer group 0 will be described. Address signals which identify the paths to be closed through the second-stage switches 402A are contained in the second-stage switch controllers 404A and are passed to the busy bus circuits on the address conductors 502. Address signals are passed to the decoders 503 and to the selectors 504 of each of the busy bus circuits 406A. The decoders 503 each decode the address signals to provide a high signal on one of their output conductors going to the inverters 505A through 505N such that one side of one of the resistors 506A through 506N is grounded in each of the busy bus circuits. The selectors 504 in response to the address signals select the output signal of the one of the comparator circuits 507A through 507N which corresponds to the buffer circuit addressed in each of the second-stage switch controllers. The input signal to one of the inputs of the selected comparators in each of the busy bus circuits is determined by the connected pull-up resistor and the corresponding ones of the resistors 506A through 506N which are grounded.

The resistors 501A through 501N and 506A through 506N are all of equal resistance value. The resistors 508 and 509 form resistance divider circuits which provide a voltage signal which is slightly below one-half of the positive supply voltage +V to the second input of the comparators 507A through 507N. If only one of the second-stage switch controllers associated with buffer group 0 contains an address which identifies a given one of the buffer circuits in buffer group 0, then the voltage at one input of the corresponding ones of the comparators 507A through 507N of the busy bus circuits 406A will approximate one-half of +V while the voltage on the other input of the comparators will be slightly below one-half +V. A connection enable signal is generated by the comparator circuits, selected by the selectors 504 and passed to the second-stage switch controllers 404A and ultimately back to the message controllers 113a through 113n. The requested connection paths through the switch 115 are completed in response to connection enable signals. On the other hand, if two or more second-stage switch controllers contain the address of the same buffer circuit in the same group of buffer circuits, then two or more resistors are connected to ground in parallel. Consequently, the voltage presented to the associated comparator circuits in below the voltage provided by the voltage dividers comprising the resistors 508 and 509 and a busy signal is generated at the output of the appropriate comparators. The busy signals are selected and passed to the second-stage switch controllers which contain the same buffer address signals and ultimately the busy signals are passed to the message controllers requesting connection to the same buffer circuit. The requested connection paths through the switch 115 are not completed in response to a busy signal.

It is to be noted that the only time that a buffer busy condition should exist is when a message recorded on a disc transport is being duplicated on another disc transport of another MC. Message duplication is incorporated into the MSS for reliability purposes. Duplication is performed in the following manner: the MC which controls the disc transport containing the message to be duplicated transmits the message to a buffer circuit and the MC which controls the disc transport where the duplicate copy is to be made reads the message from that buffer circuit and duplicates it by recording it on an assigned one of its disc transports. Since the MCs operate asynchronously relative to one another both MCs may be attempting to connect to the buffer circuit being used for the duplication process and that buffer circuit can appear busy to one or both of the MCs involved in the message duplication process.

FIG. 6 is a block diagram of the buffer circuit 116 of FIG. 1 which is representative of the buffer circuits contained in the interface circuits 127a through 127n and 128a through 128n. The buffer circuits provide speed buffering between the CODECs represented by the CODEC 107 and the MCs 113a through 113n shown in FIG. 1. For message recording, the buffer circuits collect and store data from the CODECs at a first data transfer rate. When sufficient data has accumulated in the buffer circuit to fill one track on a disc transport, an assigned MC transfers the data to an assigned one of its disc transports at a second higher data transfer rate. For message playback, the buffer circuits collect and store data from the MCs at the second data transfer rate and send this data to the CODECs at the slower first data transfer rate.

Data is stored in the buffer memory 601 which is a random access memory (RAM) organized as a first-in-first-out (FIFO) register. The memory control 606 comprises a write address counter, a read address counter, and a word count counter. Data to be written into the buffer memory 601 are written at addresses specified by the write address counter which is incremented by one after each write operation. Data to be read from the buffer memory are read at addresses specified by the read address counter which is incremented by one after each read operation. The word count counter is incremented by one for each write operation and decremented by one for each read operation. Incoming data signals are passed serially from the MC data decoder 602 and the CODEC to the input shift register 604 via the conductors 618 and 603 respectively and the multiplexer 617. When the input shift register 604 is full, a signal is passed to the buffer control 612 which responds by loading the data in parallel into the input latch 605 and the input latch generates an input latch full signal which is sent to the memory control 606. The input latch 605 temporarily stores the data until it can be written into the buffer memory. A latch is a register circuit which allows input data to transfer to the latch output terminals for one state of an input control signal and for the other state of the control signal retains the input data present at the time of the control signal transition at the output terminals irrespective of the input data. Upon receiving the input latch full signal, the memory control 606 causes the contents of the input latch 605 to be written into the buffer memory 601 at the address specified by the write address counter and increments the write address counter by one.

Serial data is shifted out of the output shift register 607 to either a message controller via the MC data encoder 608 or to the associated CODEC via the gate 609. When the output shift register 607 is emptied, a signal is passed from the output shift register to the buffer control 612 which responds by loading the contents of the output latch 610 into the output shift register 607. The output latch then sends an output latch empty signal to the memory control 606. The memory control 606 in response to the output latch empty signal, reads data from the buffer memory 601 at the buffer memory address specified by the read address counter, loads the data read into the output latch 610 and increments the read address counter by one. The output latch ensures that data is available to be loaded into the output shift register upon the receipt of an output shift register empty signal. The output of the word count counter in the memory control 606 is decoded to generate the half full and half empty signals which the MC utilizes in record and playback operations, respectively, as previously described.

The MC data decoder 602 receives encoded or combined clock and data signals from the MCs and decodes the combined signals into separate clock signals and data signals. The data signals are passed to the multiplexer 617 via the conductor 618 while the clock signals are passed to the buffer control 612 via the conductor 619. The MC data encoder 608 encodes data signals from the output shift register 607 and clock signals from the buffer control 612 into a combined clock and data signal for transmission to the MCs via the conductor 616. Clock signals for transmission from the buffer circuit to the MCs are provided by the switch interface unit as previously described. When clock signals alone are required by the buffer circuit, a string of zero data is transmitted to convey the clock signals.

The cyclic redundancy code (CRC) generator and checker 611 comprises a CRC generator and checker circuit, a data bit counter, and a data block counter. The CRC generator and checker circuit receives data from the CODEC via the conductor 603 and generates a 16-bit CRC check word over each data block of 1007 bits of data which comes from the CODEC. The CRC check word is generated as the data is loaded into the buffer memory 601. The CRC check word and a single bit indicating whether voice is present in the data block covered by the CRC check word are included as the last 17 bits of each data block comprising the 1007 bits of data, the 16 bits of CRC check word, and finally, the voice present indicating bit. The CRC check word and the voice present indicating bit are loaded into the input shift register 604 during the time interval between the 1007th bit of one data block and the first data bit of the succeeding data block. This is accomplished by loading the CRC check word and the voice indicating bit into the input shift register at high speed with clock pulses from a local buffer clock. The data bit counter provides data bit count signals to the buffer control 612 which responds to a data bit count signal of 1007 to control the multiplexer 617 to pass the CRC check word from the CRC checker and generator 611 via the conductor 620. The buffer control then provides high speed clock pulses to the CRC generator and checker circuit and the input shift register 604. After the CRC check word is loaded into the input shift register, the buffer control 612 loads the voice indicating bit into the input shift register via the multiplexer 617, clears the voice indicating bit circuitry, and controls the multiplexer 617 to again pass data received on the conductor 603.

The CRC generator and checker 611 also checks the data coming from a disc transport during playback and removes the CRC check word and the voice indicating bit from that data as it is sent to the CODEC. The data bit counter of the CRC generator and checker 611 counts the data bits shifted out of the output shift register 607 to the CODEC via the gate 609. The buffer control 612 responds to a data bit count of 1007 to open the gate 609 so that no signals are passed to the CODEC and to provide high speed clock pulses to the output shift register 607 and the CRC generator and checker which receives the 16-bit CRC check word of the data block at the higher speed and performs the CRC check. CRC pass/fail signals are passed to the buffer control 612 where they are accumulated in a CRC error counter circuit. After the CRC check word and the voice indicating bit have been shifted out of the output shift register, the buffer control closes the gate 609 so that signals can again be passed to the CODEC and restores the slower speed CODEC outpulsing clock. The CRC check word and voice present indicating bit are thus stripped from each data block in one interpulse CODEC clock period so that none of the CRC check word bits or the voice present indicating bits are passed to the CODEC. As previously described, the CRC check word is utilized by the MC in the switch interface unit 205 to check the buffer memory 601 and the path between the buffer circuits and the MCs.

The buffer circuits are controlled in a manner similar to the switch 115 as previously described. The MC sends coded control signals to the buffer control logic circuit 612 and the control signals are serially loaded into a command state register if the MC provides a high logic level signal or a "1" on the supervisory conductor 615. The data and clock conductor 614, the supervisory conductor 615, and the data and clock conductor 616 are respectively connected to the data and clock conductor 312, the supervisory conductor 313, and the data and clock conductor 314 of the MCs via the switch 115. The buffer command states include: record, record prime, and playback which control the transfer of data between the buffer circuits and the associated CODECs; load and empty which control the data transfer between the buffer circuits and the MCs; and read status and initialize which respectively allow the MC to read the status of the buffer circuit and to initialize the buffer circuit by clearing the read address counter and the write address counter of the buffer memory control 606 and by removing any command states present in the buffer circuit.

The record, record prime, and playback command states are mutually exclusive and are decoded and stored in three interlocked flip-flop circuits contained in the buffer control 612. When the buffer circuit is placed into any one of these three command states, the corresponding flip-flop circuit is placed in the set state which places the other two flip-flop circuits in the clear state. The load and empty command states are mutually exclusive and are decoded and stored in two flip-flop circuits which are contained in the buffer control 612. Both the load and empty command state flip-flop circuits are cleared by the supervisory signal on the conductor 615 going high. The read status command state enables the reading of status registers contained in the buffer control 612. Status information includes the identification of the buffer circuit so that the MC can verify that the buffer circuit requested has been properly connected by the switch 115 and information which includes the CRC error count, and the half full and half empty signals previously described.

The record command state is entered into the buffer control 612 by the MC when data is to be received from the CODEC by the buffer circuit. The record command initially places the buffer circuit into the record prime command state by setting the record prime flip-flop circuit. The record prime command state is a psuedo command state to provide for the deletion of leading silence from messages to be stored in the message storage system. For leading silence deletion in the record prime command state, the buffer circuit records four data blocks in the buffer memory as previously described and if the voice present signal transmitted from the voice present detector via the conductor 613 has been inactive during that entire period of time, those four data blocks are effectively erased by resetting the buffer memory to write over those four blocks of data. The output signals from the data block counter in the CRC generator and checker 611 are passed to the buffer control 612. If the buffer is in the record prime command state and the data block counter reaches a count of four, the buffer control sends a reset signal to the read address counter and the write address counter of the memory control 606 which resets the buffer memory 601. This resetting operation continues until the voice present indication to the buffer circuit goes active at which time the buffer circuit switches to the record mode and continues to record data from the CODEC until stopped by the MC. If a voice present signal is received while the buffer is in the record prime command state, the record flip-flop circuit is set which clears the record prime flip-flop circuit thus autonomously changing the buffer command state from record prime to record and preventing any further resetting of the buffer memory. The playback command state is entered in the buffer control 612 by the MC when data is to be sent to the CODEC from the buffer circuit via the gate 609. The buffer circuits are arranged to autonomously transfer from the playback state to the record prime state once message playback is completed. This feature is referred to as automatic turnaround of the buffer circuit and provides a nearly immediate capability to receive a message to be stored by the MSS after an instructional message has been played out to a customer. The contents of the word count counter of the memory control 606 are transferred to the buffer control 612. If the contents of the word count counter reaches zero and the buffer circuit is in the playback state, the record prime flip-flop circuit is set which clears the playback flip-flop circuit.

The voice present signal from the voice present detector 117 is passed to the buffer control logic circuit 612 on the voice present conductor 613. A voice present register in the buffer control 612 monitors the voice present conductor and registers a logical "1" if the voice present signal is active during the recording of a data block transferred from the CODEC. The voice indicating bit contained in the voice present register is transferred to the input shift register with the CRC check word at the end of each data block as previously described and the voice present register is cleared. The inclusion of the voice present bit in the data blocks allows for the deletion of trailing silence in a message recorded by the MSS as previously described under the description of the switch interface unit of the MC.

It is to be understood that the above-described embodiment is merely illustrative of the principles of our invention; other arrangements may be devised by those skilled in the art without departing from the spirit and scope of the invention.

What is claimed is:

1. A message storage system wherein a message comprises a plurality of sequential message segments each containing message information signals and wherein trailing message segments, representing final segments of said message, which are devoid of significant message information signals are eliminated from said message, said message storage system comprising:

input means (106, 107, 116);

storage means (114a through 114n) for storing message segments comprised of message information signals;

detection means (117) connected to said input means for detecting significant message information signals received by said input means and for generating a message present signal during periods of time when significant message information signals are detected;

connection means (113a through 113n and 115) for connecting said input means and said storage means;

CHARACTERIZED IN THAT said connection means comprises:

means (310, 311) responsive to said message present signal for generating output signals defining message segments in which significant message signals are not detected; and processor means (203) connected to said storage means and responsive to said output signals for writing control signals, indicating that no significant message information signals are stored therein, into storage locations of said storage means corresponding to message segments defined by said output signals, said processor means responsive to said means for generating output signals for eliminating from said storage means those message segments which are devoid of significant message signals.

2. A message storage system in accordance with claim 1 further characterized in that said means for generating output signals comprises means (310) for detecting receipt of message segments and for generating a control pulse for each of said message segments detected, and further comprises a counter means (311) for counting said control pulses, and said counter means is reset to zero in response to said message present signal such that the contents of said counter means represent the number of message segments devoid of significant message information signals.

3. A message storage system in accordance with claim 1 or claim 2 further characterized in that said significant message information signals are voice signals and message segments which are devoid of significant message information signals represent silence, and said message present signal indicates periods of time when voice signals are detected such that trailing silence is deleted from said message.

4. A message storage system in accordance with claim 1 wherein messages are stored as digitally encoded data blocks further characterized in that:

said input means comprises means (611, 612) responsive to said message present signal for generating a message present bit per block of digitally encoded data indicating whether said data block contains significant message information signals;

said means for generating output signals comprises counter means (311) which is incremented for each message present bit which indicates no significant message information signals are present in the data block, and which is cleared for each message present bit which indicates significant message information signals are present in the data block.

5. In a message storage system wherein a message comprises sequential message portions each containing a plurality of message information signals, a method for deleting trailing message portions, representing final portions of said message, which are devoid of significant message information signals from said message comprising the following steps:

(a) receiving signals representative of messages to be stored in said message storage system;
(b) storing said signals in a memory;
(c) detecting significant message information signals in said signals to be stored in said message storage system;
(d) generating a message present signal during periods of time when significant message information signals are detected;

CHARACTERIZED IN THAT said method comprises the following additional steps:

(e) measuring periods of time during which no significant message information signals are detected; and
(f) deleting the final stored message portion which corresponds to the final period of time during which no significant message information signals are detected.

6. The method in accordance with claim 5 further characterized in that step (e) comprises the following steps:

(g) generating a sequence of periodic pulses;
(h) counting said periodic pulses during periods of time when no message present signal is generated; and
(i) clearing the count generated in accordance with step (h) in response to one of said periodic pulses if a message present signal has been generated since the occurrence of the last periodic pulse.

7. In a message storage system wherein a message comprises a plurality of sequential message portions each containing a plurality of message information signals and each message portion is stored as a digitally encoded data block, the method for deleting trailing message portions, representing final portions of said message, which are devoid of significant message information signals comprising the following steps:

(a) receiving signals representative of messages to be stored in said message storage system;
(b) storing said signals as digitally encoded data blocks in a memory;
(c) detecting significant message information signals in said signals to be stored in said message storage system;
(d) generating a message present signal during periods of time when said significant message information signals are detected;

CHARACTERIZED IN THAT said method comprises the following additional steps:

(e) generating a message present bit per data block in response to said message present signal to indicate whether said message present signal has been active during the portion of the message represented by the data block;
(f) incorporating said message present bits into the data blocks to which they correspond;
(g) identifying the message present bits in the data blocks;
(h) accumulating a count of consecutive data blocks wherein the message present bits indicate that the data blocks do not contain significant message information signals;
(i) clearing the count accumulated in step (h) for each occurrence of a message present bit which indicates that a data block contains significant message information signals; and
(j) deleting the trailing data blocks of a message stored in said memory, the number of said trailing data blocks to be deleted being equal to the count accumulated in step (h) upon completion of the storage of the message.

8. A message storage system in accordance with claim 1 further characterized in that said storage means further comprises a plurality of data block locations, each of said data block locations being adapted to store one of said message segments and having a header portion for storing said control signals and a data portion for storing said message information signals.

* * * * *